United States Patent [19]

Mizuno et al.

[11] 4,207,553
[45] Jun. 10, 1980

[54] CONTROL APPARATUS FOR VEHICLE DIRECTIONAL LAMPS

[75] Inventors: Tiaki Mizuno, Toyota; Yoshichi Kawashima, Gifu, both of Japan

[73] Assignee: Nippondenso Co., Ltd., Kariya, Japan

[21] Appl. No.: 845,073

[22] Filed: Oct. 25, 1977

[30] Foreign Application Priority Data

Dec. 25, 1976 [JP] Japan .................. 51-156981

[51] Int. Cl.$^2$ .................. B60Q 1/38; G08B 5/38; G08B 21/00
[52] U.S. Cl. .................. 340/73; 340/81 R; 340/642; 315/200 A
[58] Field of Search .................. 340/73, 81 R, 81 F, 340/641, 642, 643, 661, 662, 663, 664, 645; 307/10 LS; 315/82, 77, 83, 88, 93, 200 A

[56] References Cited

U.S. PATENT DOCUMENTS

| | | | |
|---|---|---|---|
| 3,329,868 | 7/1967 | Domann et al. | 340/81 R |
| 3,421,157 | 1/1969 | Atkins | 340/642 |
| 3,523,238 | 8/1970 | Jones | 340/642 |
| 3,559,198 | 1/1971 | Moreines | 340/661 |
| 3,665,207 | 5/1972 | Sieber | 340/81 R |
| 3,781,841 | 12/1973 | Hughes | 340/642 |
| 3,858,177 | 12/1974 | Kugelmann et al. | 340/81 R |
| 3,898,513 | 8/1975 | Kopernik et al. | 340/642 |
| 4,150,359 | 4/1979 | Mizuno et al. | 340/73 |

*Primary Examiner*—John W. Caldwell, Sr.
*Assistant Examiner*—Donnie L. Crosland
*Attorney, Agent, or Firm*—Cushman, Darby & Cushman

[57] ABSTRACT

A control apparatus for use in the direction indicating system of a vehicle having a group of front, rear and side directional lamps. The control apparatus includes a capacitor which is charged and discharged alternately and a comparator which reverses the charging and discharging of the capacitor by comparing the voltage across the capacitor with a reference voltage so that the directional lamps flash periodically. The reference voltage is changed from one to another value upon disconnection of the side directional lamp and further changed from one to the other value upon disconnection of the front or rear directional lamp, thus increasing the flashing frequency of the directional lamps upon each disconnection. The capacitor is charged and discharged by respective constant currents to decrease frequency fluctuation at each flashing frequency of the directional lamps.

4 Claims, 7 Drawing Figures

CONTROL APPARATUS FOR VEHICLE DIRECTIONAL LAMPS

BACKGROUND OF THE INVENTION

The present invention relates to a control apparatus for directional lamps of a vehicle and particularly to a control apparatus which functions to indicate the turning direction of the vehicle and to indicate each disconnection of a front, rear and side directional lamps by the frequency change in periodic flashing of the directional lamps.

It is known well in the direction indicating system of an automotive vehicle that a group of front, rear and side directional lamps are mounted at respective front, rear and side portions of the vehicle as vehicle directional lamps and these lamps are energized periodically to flash upon requirement for the indication of vehicle turning direction. It is also known that the periodic flashing of the directional lamps is controlled by an electronic control apparatus designed to detect and indicate the disconnection of the lamps.

One of this system is disclosed in the prior art, U.S. Pat. No. 3,858,177, in which a control apparatus is provided to control the periodic flashing of the front and rear lamps. This control apparatus includes a capacitor which is charged and discharged alternately and a comparator which compares the voltage across the capacitor with a reference voltage to reverse the charge and discharge of the capacitor. Since the reference voltage is changed from one to the other value upon disconnection of the front or rear directional lamp and these lamps are energized during either the charge or discharge of the capacitor, the flashing frequency of the directional lamps is changed upon lamp disconnection for the disconnection indicating purpose. It should be noticed that the lamp disconnection indication is required in relation not only to the front and rear directional lamps but also to the side directional lamp. It should be noticed further that, since the voltage across the capacitor in the control apparatus changes exponentially, a small change in the reference voltage results in a large change in the flashing frequency of the directional lamps.

SUMMARY OF THE INVENTION

It is a primary object of this invention to provide a control apparatus which is improved to detect and indicate the disconnection of not only a front and rear directional lamps but also a side directional lamp.

It is another object of this invention to provide a control apparatus which is improved to increase, in frequency, the periodic flashing of the directional lamps upon each disconnection thereof.

It is a further object of this invention to provide a control apparatus which includes a capacitor adapted to be charged and discharged alternately by respective constant currents.

DETAILED DESCRIPTION OF THE PREFERRED EMBODIMENT

Figure 1:
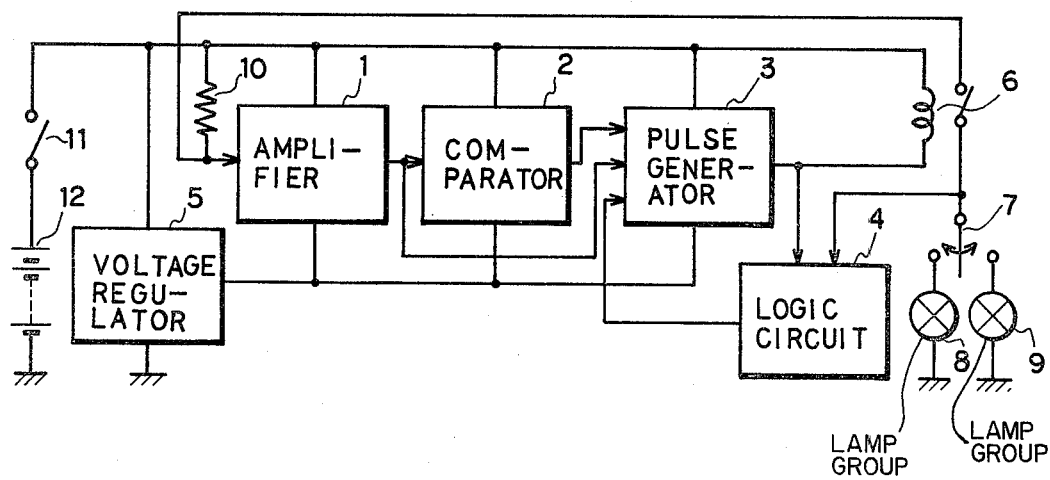
FIG. 1 is a schematic block diagram illustrating overall construction of the embodiment according to this invention.

Referring first to FIG. 1 in which two directional lamp groups 8 and 9 are shown in series connection with a manually-operated selection switch 7, a relay switch 6, a current detecting resistor 10, a battery switch 11 and a battery 12. The directional lamp groups 8 and 9 are mounted on respective left and right portions of an automotive vehicle, for example. As is known well, either one of directional lamp groups 8 and 9 is energized upon closure of the selection switch 7 by the battery 12 through the battery switch 11, the resistor 10, and the relay switch 6. The relay switch 6 is closed periodically to cause the lamp group 8 or 9 to flash periodically for indicating the turning direction of the vehicle.

Provided to control the periodic closure of the relay switch 6 is a control apparatus comprising an amplifier 1, a comparator 2, a pulse generator 3 and a logic circuit 4. The amplifier 1 is connected to amplify the signal which is developed by the resistor 10 and changed in response to the lamp failure, or the disconnection of a lamp filament. The comparator 2 is connected to compare the output signal of the amplifier 1 with a reference signal established therein. The pulse generator 3 is connected to generate a pulse signal having a frequency and duty ratio which are responsive to respective output signals of the amplifier 1 and the comparator 2. The logic circuit 4 is connected to control the pulse generating operation of the pulse generator 3 in response to the switching conditions of the relay switch 6 and the selection switch 7. Provided to supply the amplifier 1, the comparator 2 and the pulse generator 3 with a constant voltage is a voltage regulator 5.

Figure 3:
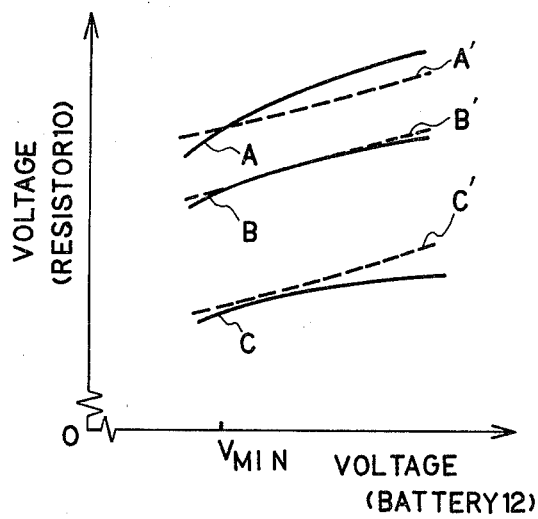
FIG. 3 is a characteristic chart illustrating relations between the voltages across a battery and a current detecting resistor shown in FIG. 2.
Figure 2:
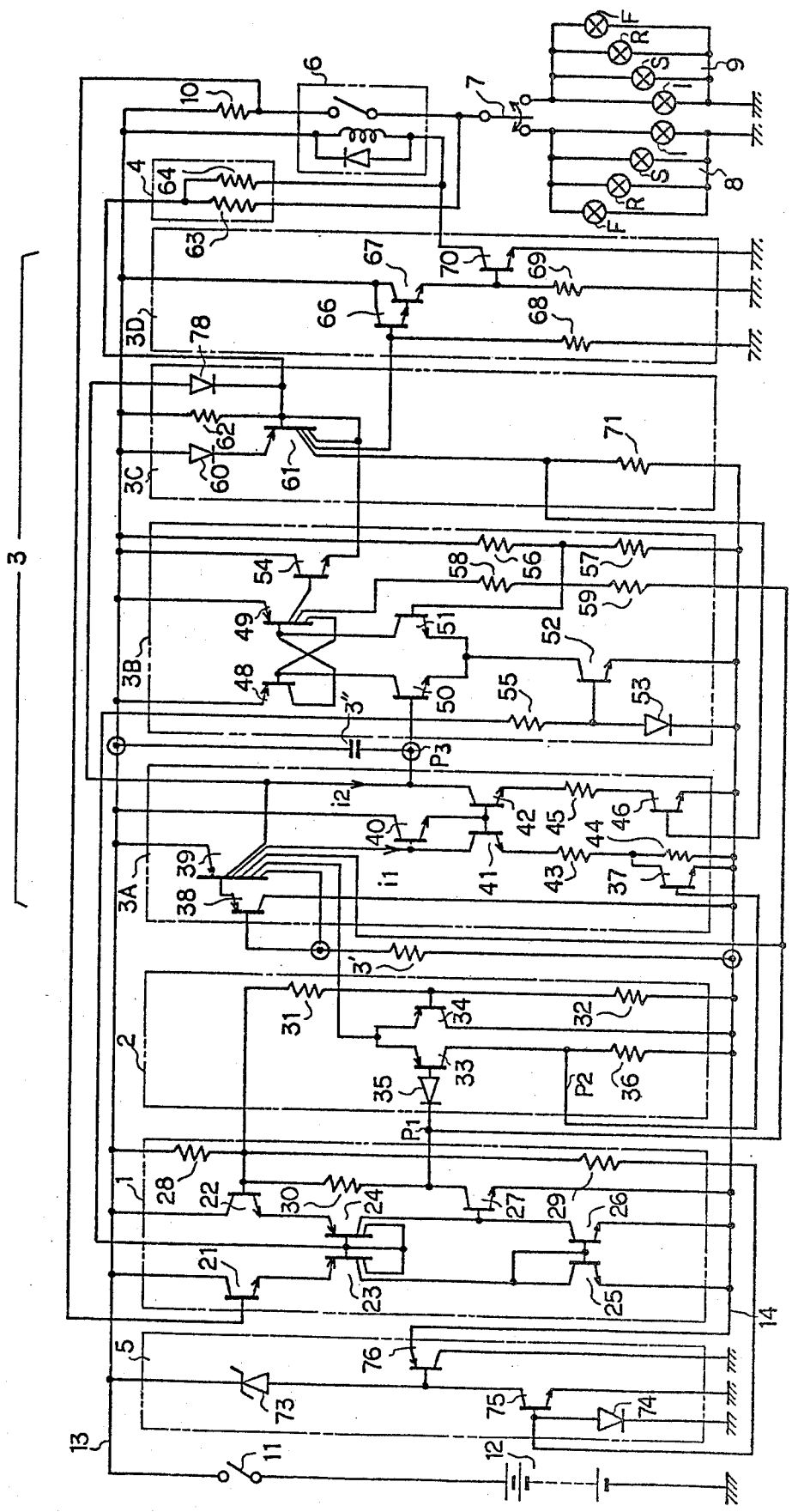
FIG. 2 is an electric wiring diagram illustrating the detail circuit construction of the embodiment shown in FIG. 1.

Referring next to FIG. 2, it should be noticed that each of the lamp groups 8 and 9 comprises a front, rear, side and inner directional lamps which are connected in parallel and denoted by respective alphabetical letters F, R, S and I. The directional lamps F, R and S are mounted on respective front, rear and side outside portions of the vehicle, whereas the directional lamp I is mounted on an inside portion of the vehicle. The lamps F, R, S and I in this embodiment are assumed to consume 23 watts, 23 watts, 8 watts and 3 watts in electric energy, respectively, with 12 volts across the battery 12. It is experimentally proved that the total electric current flowing through the resistor 10 increases nonlinearly as the battery voltage increases. Since the voltage across the resistor 10 is proportional to the total current flowing therethrough, it also changes nonlinearly. This characteristic is shown in FIG. 3, wherein solid lines A, B and C represent the voltages developed across the resistor 10 in respective conditions when all lamps F, R, S and I are not disconnected, the side lamp S is disconnected and one of the front and rear lamps 8 and 9 is disconnected.

Referring further to FIG. 2, the embodiment of the control apparatus designed to be integrated into a single semiconductor chip is described in detail hereinunder. The voltage regulator 5 comprises a zener diode 73, a diode 74 and transistors 75 and 76. The zener diode 73 having a constant breakdown voltage is connected in series with the emitter-collector path of the transistor 75 between the positive bus 13 and the ground. The junction between the zener diode 73 and the transistor 75 is connected to the base of the transistor 76, and the emitter-collector path of the transistor 76 is connected between the negative bus 14 and the ground. Since the base potential of the transistor 76 changes in proportion to the potential of the positive bus 13, and since the potential of the negative bus 14 changes in proportion to the emitter potential of the transistor 76, the voltage between the positive bus 13 and the negative bus 14 is kept unchanged so that the amplifier 1, the comparator 2 and the pulse generator 3 are supplied with the constant voltage.

The amplifier 1 comprises transistors 21, 22, 25, 26 and 27, multi-collector transistors 23 and 24, and resistors 28, 29 and 30. The transistor 21 is connected to be responsive to the potential at the junction between the relay switch 6 and the resistor 10, whereas the transistor 22 is responsive to the potential at the junction between the resistors 28 and 29. The transistors 21 and 22 are connected differentially. Since the resistor 29 is connected not to the negative bus 14 but to the ground through the diode 74, the potential at the base of the transistor 22 changes in proportion to the potential of the positive bus 13. The resistance values of the resistors 28 and 29 are determined so that the voltage across the resistor 28, upon disconnection of the side lamp S, is substantially equal to the voltage across the resistor 10 as represented by the dotted line B' in FIG. 3. The resistor 30 is connected to the collector of the transistor 27 and the base of the transistor 22 for a feedback purpose. The voltage across the resistor 28, therefore, changes linearly as represented by the dotted lines A' and C' in respective conditions when all the lamps F, R, S and I are not disconnected and one of the front and rear lamps F and R is disconnected. It should be further noticed in FIG. 3 that the voltages represented by dotted lines A' and C' are lower and higher than the voltages represented by the solid lines A and C, respectively, with the battery voltage higher than the critical minimum value $V_{MIN}$ (8 volts).

According to the construction described above, the amplifier 1 operates as follows.

Figure 4:
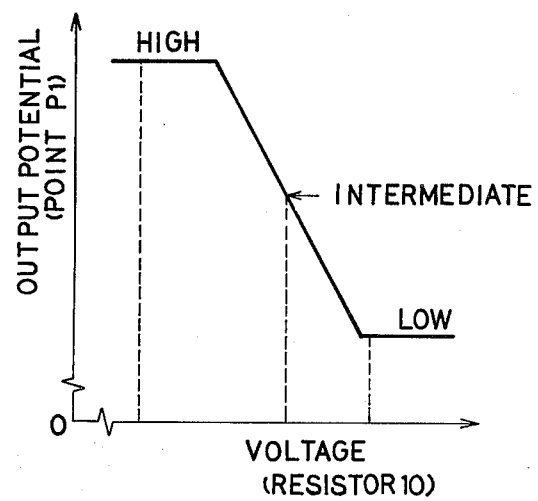
FIG. 4 is a characteristic chart illustrating a relation between the voltage across a current detecting resistor and the output potential of an amplifier shown in FIG. 2.

(a) When all the lamps F, R, S and I are not disconnected, the base potential of the transistor 22 is higher than that of the transistor 21 and, as a result, the transistors 21, 22, 23, 24, 25, 26 and 27 are kept in their respective OFF, ON, OFF, ON, OFF, OFF and ON conditions. Due to the conduction of the transistor 27, a low potential is developed at an output point $P_1$ as shown in FIG. 4. This low potential at the point $P_1$ is substantially equal to the potential of the negative bus 14 and indicates no lamp disconnections.

(b) When the side lamp S is disconnected, the base potentials of the transistors 21 and 22 are almost equal to each and, as a result, all the transistors 21 through 27 are kept in their respective active conditions. Due to the active condition of the transistor 27, an intermediate potential is developed at the output point $P_1$ as shown in FIG. 4. This intermediate potential at the point $P_1$ is higher and lower than respective potentials of the negative bus 14 and the positive bus 13.

(c) When the front lamp F or the rear lamp R is disconnected, the base potential of the transistor 21 is higher than that of the transistor 22 and, as a result, the transistors 21, 22, 23, 24, 25, 26 and 27 are kept in their respective ON, OFF, ON, OFF, ON, ON and OFF conditions. Due to the nonconduction of the transistor 27, a high potential is developed at the output point $P_1$ as shown in FIG. 4. This high potential at the point $P_1$ is substantially equal to the potential of the positive bus 13.

The comparator 2 comprises resistors 31, 32, 36, transistors 33 and 34, and a diode 35. The transistor 33 is connected to be responsive to the potential at the point $P_1$, whereas the transistor 34 is connected to be responsive to the reference potential at the junction between the resistors 31 and 32. The resistors 31 and 32 are connected is series with the resistor 28 of the amplifier 1 between the positive bus 13 and the negative bus 14 so that the reference potential changes in proportion to the potential of the positive bus 13. The resistance values of the resistors 31 and 32 are determined so that the reference potential is higher than the intermediate potential developed at the point $P_1$ and lower than the high potential developed at the point $P_1$.

According to the construction described above, the comparator 2 operates as follows.

(a) When all the lamps F, R, S and I are not disconnected, the base potential of the transistor 33 is lower than that of the transistor 34 and, as a result, the transistors 33 and 34 are rendered ON and OFF, respectively. A high potential is developed at an output point $P_2$ due to the conduction of the transistor 33.

(b) When the side lamp S is disconnected, the transistors 33 and 34 are rendered ON and OFF, respectively, with the base potential of the transistor 33 being lower than that of the transistor 34. As a result, the potential at the point $P_2$ is kept high.

(c) When the front lamp F or the rear lamp R is disconnected, the base potential of the transistor 33 is higher than that of the transistor 34 and, as a result, the transistors 33 and 34 are rendered OFF and ON, respectively. A low potential is developed at the output point $P_2$ due to the nonconduction of the transistor 33.

The pulse generator 3 primarily includes a resistor 3' and a capacitor 3" which are not integrated into a single semiconductor chip but connected to the single semiconductor chip. The pulse generator 3 to be integrated is divided into four circuit stages from functional standpoint. These circuit stages are denoted as a constant current circuit 3A, a comparison circuit 3B, a switchover circuit 3C and a power circuit 3D which are described in detail hereinunder.

The constant current circuit 3A constitutes a triangular signal generator in combination with the resistor 3' and the capacitor 3" and comprises transistors 37, 38, 40, 41, 42 and 46, a multi-collector transistor 39, and resistors 43, 44 and 45. One of multiple collectors of the transistor 39 is connected to the resistor 3' which is further connected to the negative bus 14 and another one of multiple collectors is connected to the capacitor 3" which is further connected to the positive bus 13. The transistors 42 and 46 and the resistor 45 are connected in series with the capacitor 3" to constitute a first current path which is also in series with the transistor 39. The transistor 41 and the resistors 43 and 44 are connected in series with the transistor 39 to constitute a second current path. The transistor 37 responsive to the output potential of the comparator 2 is connected in parallel with the resistor 44.

Figure 5:
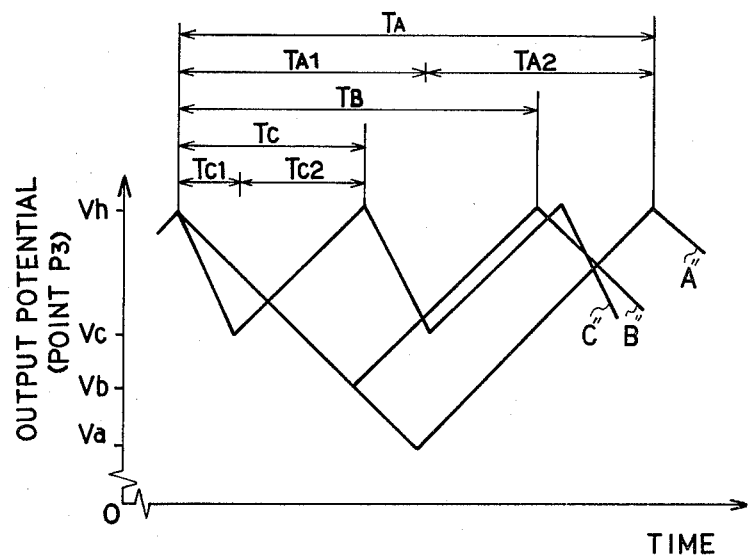
FIG. 5 is a waveform chart illustrating triangular signals A", B" and C" developed by a triangular signal generator shown in FIG. 2.

The constant current circuit 3A operates as follows. It is assumed herein that the transistor 39 produces two constant currents $i_1$ and $i_2$ and that the resistors 43, 44 and 45 have respective constant resistance values $R_{43}$, $R_{44}$ and $R_{45}$. During the conduction of the transistor 46, an electric current equal to $[(R_{43}+R_{44})i_1/R_{45}]$ flows through the first electric path with the transistor 37 in the second current path being kept OFF. As a result, the capacitor 3" is charged by an electric current equal to $[(R_{43}+R_{44})i_1/R_{45}-i_2]$ and the potential of an output point $P_3$ decreases at a constant decreasing speed. During the nonconduction of the transistor 46, the capacitor 3" is discharged by the electric current $i_2$ and the potential at the point $P_3$ increases at a constant increasing speed. By the alternate conduction and nonconduction of the transistor 46, a triangular signal is developed at the output point $P_3$ as shown in FIG. 5 in which three triangular signals A", B" and C" are illustrated. Each of the triangular signals A", B" and C" is developed, as will be described later, by changing the ON-OFF durations of the transistor 46. It should be noticed in FIG. 5 that the increasing speed and the decreasing speed are equal to each other so far as the triangular signals A" and B" are concerned and that the increasing speed and the decreasing speed are different from each other so far as the triangular signal C" is concerned. The increasing speed and decreasing speed of each triangular signal is controlled in the following manner.

(a) When all the directional lamps are not disconnected, the transistor 37 is rendered ON in response to the high output potential of the comparator 2. Due to the conduction of the transistor 37, the charging current for the capacitor 3" becomes equal to $[R_{43} \cdot i_1/R_{45}-i_2]$ with the resistance $R_{44}$ being zero. This charging circuit determines the decreasing speed of the triangular signal A" the increasing speed of which is determined by the discharging current $i_2$. By determining the charging current $[R_{43} \cdot i_1/R_{45}-i_2]$ and the discharging current $i_2$ to be equal to each other, the increasing and decreasing speeds are equal to each other. The duty ratio $[T_{A1}/(T_{A1}+T_{A2})]$ of the triangular signal A" becomes 0.5 in this condition.

(b) When the side lamp S is disconnected, the transistor 37 is rendered ON in response to the high output potential of the comparator 2. The duty ratio of the triangular signal B" becomes 0.5 in this condition provided that an equation $i_2=[R_{43} \cdot i_1/R_{45}-i_2]$ is established.

(c) When the front lamp F or the rear lamp R is disconnected, the transistor 37 is rendered OFF in response to the low output potential of the comparator 2. Due to the nonconduction of the transistor 37, the charging current for the capacitor 3" becomes equal to $[(R_{43}+R_{44})i_1/R_{45}-i_2]$, whereas the discharging current is equal to $i_2$. Since the charging current $[(R_{43}+R_{44})i_1/R_{45}-i_2]$ is larger than $[R_{43} \cdot i_1/R_{45}-i_2]$, the decreasing speed of the triangular signal C" is higher than the increasing speed of the same. The duty ratio $[T_{C1}/(T_{C1}+T_{C2})]$ of the triangular signal C" becomes smaller than 0.5. The duty ratio in this condition is desirably determined to be about 0.3.

The comparison circuit 3B comprises transistors 48, 49, 50, 51, 52 and 54, a diode 53, and resistors 55, 56, 57, 58 and 59. The resistors 56 and 57 are connected in series between the positive and negative buses 13 and 14, whereas the resistors 58 and 59 are connected in series with the multi-collector transistor 49 between the positive bus 13 and the output point $P_1$ of the amplifier 1. The junction between the resistors 56 and 57 and the junction between the resistors 58 and 59 are connected in common to develop thereat a reference potential which is changed in response to the output potential of the amplifier 1. The transistor 50 is connected to be responsive to the potential developed at the point $P_3$, whereas the transistor 51 is connected to be responsive to the reference potential.

The comparison circuit 3B operates as follows.

(a) When all the directional lamps are not disconnected, the low output potential of the amplifier 1 is applied to the resistor 59 and, as a result, the resistor 59 is regarded as connected to the negative bus 14. While the potential at the point $P_3$ is decreasing due to the charging of the capacitor 3", the base potential of the transistor 50 is higher than that of the transistor 51 and, as a result, the transistors 48, 49, 50, 51 and 52 are kept in their respective ON, OFF, ON, OFF and active conditions. Due to the nonconduction of the transistor 49, the transistor 54 is also kept in its OFF condition and the reference potential is kept at the lowest value $V_a$ shown in FIG. 5. When the base potential of the transistor 50 becomes equal to the lowest reference potential $V_a$ applied to the base of the transistor 51, the transistors 48, 49, 50 and 51 are reversed to their respective OFF, ON, OFF and ON conditions. Due to the conduction of the transistor 49, the transistor 54 is reversed to its ON condition and the reference potential is changed from the lowest value $V_a$ to the highest value $V_h$ shown in FIG. 5. The transistors 48, 49, 50, 51 and 52 are kept in their respective OFF, ON, OFF, ON and ON conditions until when the base potential of the transistor 50 becomes equal to the highest potential $V_h$ applied to the base of the transistor 51. Thereafter, the transistors 48, 49, 50, 51 and 54 are reversed again to their respective ON, OFF, ON, OFF and OFF conditions and the reference potential is decreased to the lowest value $V_a$ to repeat the foregoing operation.

(b) When the side lamp S is disconnected, the intermediate output potential of the amplifier 1 is applied to the resistor 59. As a result, the lower reference potential applied to the base of the transistor 51 is increased, that is, the lower reference potential developed in response to the nonconduction of the transistor 49 is changed to the value $V_b$ which is shown in FIG. 5 and higher than the lowest value $V_a$. In the quite same manner as described, the transistors 48, 49, 50, 51 and 54 are kept in their respective ON, OFF, ON, OFF and OFF conditions in response to the charging of the capacitor 3", whereas they are reversed in response to the discharging of the capacitor 3".

(c) When the front lamp F or the rear lamp R is disconnected, the high output potential of the amplifier 1 is applied to the resistor 59. As a result, the lower reference potential is increased to the value $V_c$ which is shown in FIG. 5 and higher than the value $V_b$. In this lamp disconnection condition, the transistors 48, 49, 50, 51 and 54 are kept in their respective ON, OFF, ON, OFF and OFF conditions in response to the charging of the capacitor 3", whereas they are reversed in response to the discharging of the capacitor 3".

The switch-over circuit 3C comprises diodes 60 and 78, a multi-collector transistor 61, and resistors 62 and 71. The transistor 61 is connected to be responsive to the ON-OFF conditions of the output transistor 54 in the comparison circuit 3B. One of multiple collectors of the transistor 61 is connected in series with the resistor 71 and the junction therebetween is connected to control the ON-OFF duration of the transistor 46 in the constant current circuit 3A. The diode 78 is connected between the output point $P_3$ of the constant current circuit 3A and the base of the multi-collector transistor 61 so that the transistor 61 is forcibly kept in its OFF condition upon closure of the battery switch 11 of the vehicle.

The switch-over circuit 3D operates as follows. The transistor 61 is rendered ON and OFF in response to the nonconduction and conduction of the transistor 54 in the comparison circuit 3B, respectively. While the transistor 61 is rendered ON, the transistor 46 in the constant current circuit 3A is also rendered ON to allow the capacitor 3" to be charged. While the transistor 61 is rendered OFF, on the contrary, the transistor 46 is also rendered OFF to allow the capacitor 3" to be discharged. The switch-over circuit 3C controls the frequency of the triangular signal in the following manner.

(a) When all the directional lamps are not disconnected, the transistor 61 is kept ON and OFF during respective time intervals proportional to the potential difference between $V_h$ and $V_a$ and determines the cycle period $T_A$ of the triangular signal A" shown in FIG. 5 to be proportional to $[V_h - V_a]$. The frequency $f_A$ of the triangular signal A" is inversely proportional to $[V_h - V_a]$ with the duty ratio being about 0.5.

(b) When the side lamp S is disconnected, the transistor 61 determines the cycle period $T_B$ of the triangular signal B" shown in FIG. 5 in proportion to the potential difference between $V_h$ and $V_b$. The frequency $f_B$ of the triangular signal B" is inversely proportional to $[V_h - V_b]$ with the duty ratio being about 0.5 and becomes higher than that of the triangular signal A".

(c) When the front lamp F or the rear lamp R is disconnected, the transistor 61 determines the cycle period $T_C$ of the triangular signal C" shown in FIG. 5 in accordance with the potential difference between $V_h$ and $V_c$. The frequency $f_C$ of the triangular signal C" is inversely proportional to $[V_h - V_c]$ with the duty ratio being about 0.3 and becomes higher than that of the triangular signal B".

The power circuit 3D comprises transistors 66, 67 and 70, and resistors 68 and 69. The transistors 66 and 67 are connected in Darlington configuration and control the ON-OFF conditions of the output transistor 70 in response to the ON-OFF conditions of the multi-collector transistor 61 in the switch-over circuit 3C. ON-OFF operation of the output transistor 70 results in the generation of a pulse signal. During the conduction of the transistor 61, all the transistors 66, 67 and 70 are rendered ON to allow the relay 6 to be energized for the flashing of the directional lamps which are not disconnected.

The logic circuit 4 comprises resistors 63 and 64. The resistor 63 is connected between the selection switch 7 and the base of the transistor 61 in the switch-over circuit 3C. The resistor 64 is connected between the collector of the transistor 70 in the power circuit 3D and the base of the transistor 61 in the switch-over circuit 3C. The logic circuit 4 operates to prevent the transistor 61 in the switch-over circuit 3C from being rendered conductive, when the selection switch 7 is not closed and the relay 6 is not energized.

The overall operation of this embodiment is described next briefly. When the battery switch 11 is first closed for the vehicle operation, the capacitor 3" is completely discharged to develop the high potential at the point $P_3$ and this high potential is applied to the base of the transistor 61 in the switch-over circuit 3C through the diode 78 to keep the transistor 61 in its OFF condition. Due to the nonconduction of the transistor 61, the relay 6 is not energized and the capacitor 3" is not charged yet. When the selection switch 7 is closed to the lamp group 8 for indicating the turning direction of vehicle, for example, a low potential is applied through the resistor 63 of the logic circuit 4 to the transistor 61 of the switch-over circuit 3D and the transistor 61 is rendered ON immediately to energize the relay 6 through the power circuit 3D and to allow the capacitor 3" to be charged. Due to the energization of the relay 6, the lamp group 8 starts to flash. After the first flashing of the lamp group 8, the lamp group 8 is controlled to flash periodically in the following manner.

(a) When all the lamps F, R, S and I are not disconnected, the amplifier 1 produces the low potential at the output point $P_1$ and the comparator 2 produces the high potential at the output point $P_2$. The pulse generator 3 produces the periodic pulse signal having the constant frequency $f_A$ and the constant duty ratio (0.5). Due to the periodic pulse signal, all the lamps in the group 8 flashes periodically at the frequency $f_A$ with the duty ratio (0.5).

(b) When the side lamp S is disconnected, the amplifier 1 produces the intermediate potential at the point $P_1$ and the comparator 2 produces the high potential at the point $P_2$. The pulse generator 3, therefore, produces the periodic pulse signal having the frequency $f_B$ and the duty ratio (0.5), and the lamps F, R and I flash periodically at the frequency $f_B$ with the duty ratio (0.5). It may be observed from the increase in flashing frequency that the side lamp S is disconnected.

(c) When the front lamp F or the rear lamp R is disconnected, the amplifier 1 produces the high potential at the point $P_1$ and the comparator 2 produces the low potential at the point $P_2$. The pulse generator 3, therefore, produces the periodic pulse signal having the frequency $f_C$ and the duty ratio (0.3), and the lamps S, I and F or R flash periodically at the frequency $f_C$ with the duty ratio (0.3). It may be observed from the increase in flashing frequency and the decrease in flashing ratio that at least one of the front lamp F and the rear lamp R is disconnected. Decreasing the flashing ratio with the increase in the flashing frequency is advantageous in that intermittent flashing of the lamps is obverved clearly.

Figure 6:
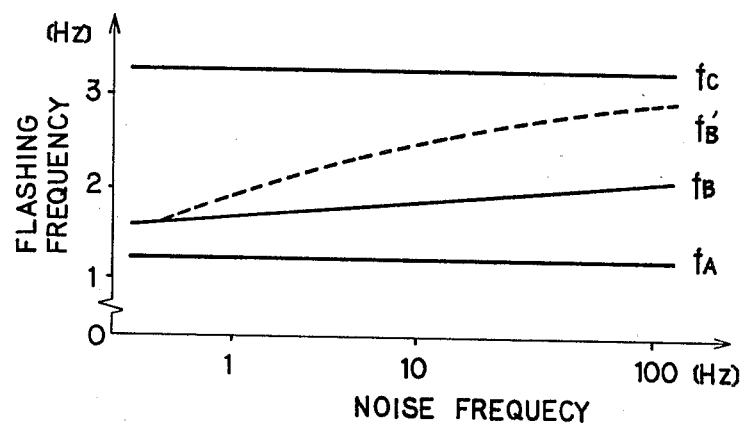
FIG. 6 is a characteristic chart illustrating relations between noise frequency and flashing frequency.
Figure 7:
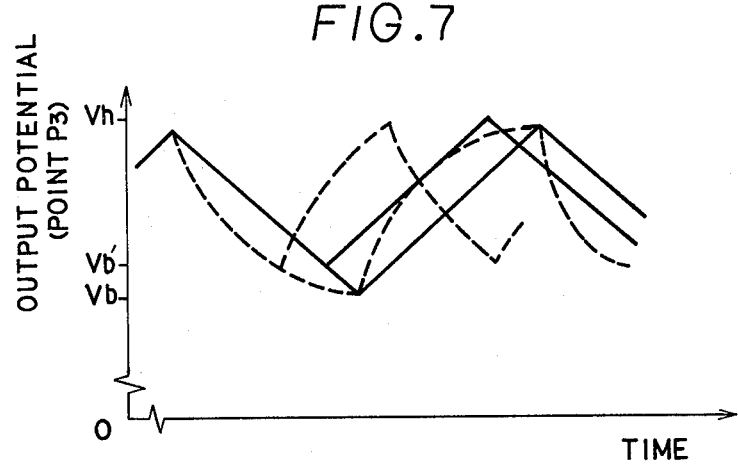
FIG. 7 is a waveform chart illustrating triangular signals developed by a triangular signal generator shown in FIG. 2 and exponential signals assumed to be developed by the other signal generator.

It should be understood in the abovedescribed embodiment that fluctuation in each flashing frequency resulting from potential changes of the battery 12 is decreased to the least. In the automotive vehicle, it is likely to occur that electric noise signals generated from electric devices mounted on the vehicle are superimposed on the battery potential and the battery potential responsively fluctuates. Average fluctuation of the battery potential in this embodiment becomes large as the frequency of the electric noise signal increases, because the lamp filament includes capacitance and resistance. Since all the transistors 21 through 27 are rendered to be either ON or OFF except when the side lamp S is disconnected, the high and low output potentials of the amplifier 1 and the reference potentials $V_h$, $V_a$ and $V_c$ in the comparison circuit 3B changes in proportion to the battery potential. The potential differences $[V_h-V_a]$ and $[V_h-V_c]$ which determine respective flashing frequencies $f_A$ and $f_C$ are maintained unchanged and, as a result, the flashing frequencies $f_A$ and $f_C$ are kept constant as shown by respective solid lines $f_A$ and $f_C$ in FIG. 6. On the contrary, since the transistors 21 through 27 in the amplifier 1 are kept active when the side lamp S is disconnected, the intermediate output potential of the amplifier 1 changes not only in proportion to the battery potential but also in accordance with the transient electric current caused by the electric noise signal. As a result, the potential difference $[V_h-V_b]$ which determines the flashing frequency $f_B$ is changed. The flashing frequency $f_B$ is increased, as shown by the solid line $f_B$ in FIG. 6, with the increase of the frequency of the electric noise signal. The fluctuating range of the flashing frequency $f_B$ is advantageously narrower than that of the frequency $f_B$, shown by the dotted line $f_B'$ in FIG. 6. It should be noted that the frequency $f_B$ is determined by the constant current as in the abovedescribed embodiment, whereas the frequency $f_B'$ is not determined by the constant current. When the capacitor 3" is not charged nor discharged by the constant current, the potential at the output point $P_3$ in FIG. 2 changes exponentially to develop an exponential signal which is shown by the dotted lines in FIG. 7, in which the triangular signals are also shown by the solid lines. Provided that the potential difference is decreased from $[V_h-V_b]$ to $[V_h-V_{b_i}]$ due to the transient electric current, the fluctuation in the frequency $f_B'$ of the exponential signal becomes larger than that in the frequency $f_B$ of the triangular signal. The triangular signal generator comprising the constant current circuit 3A, the resistor 3' and the capacitor 3" becomes advantageous more and more as the frequency of the electric noise signal increases.

What is claimed is:

1. In a direction indicating system in which either one of two lamp groups, each thereof having at least front, rear and side directional lamps connected in parallel with each other, is energized by a battery and flash periodically for indicating the turning direction of a vehicle and in which the wattage of at least the side directional lamps is different from the said front and rear lamps in the respective groups, improved control apparatus comprising:
    a resistor, connected in series with said battery, for developing a voltage thereacross corresponding to the electric current flowing from said battery to an energized one of said lamp groups;
    an amplifier, connected to be responsive to said voltage developed across said resistor, for producing an output signal having a first constant level indicative of no disconnection of said front, rear and side directional lamps of said energized group, a second constant level indicative of the disconnection of at least one of said front and rear directional lamps of said energized group, and a third level intermediate between said first and second constant levels and indicative of the disconnection of said side directional lamp of said energized group;
    a pulse signal generator, connected to be responsive to said output signal of said amplifier, for generating a train of pulse signals at first, second and third frequencies in response to said first, second and third levels of said output signal, respectively; and
    switching means, connected to be responsive to said pulse signals, for energizing said lamp group periodically,
    whereby the flashing frequency of said lamp group is changed in accordance with lamp disconnections, said pulse generator including:
    a constant current circuit for producing constant charging and discharging currents;
    a capacitor, connected to be charged and discharged by said respective constant charging and discharging currents, for producing a triangular signal; and
    a comparison circuit, connected to alternately compare the level of said triangular signal with predetermined high and low levels one of which is changed in accordance with said first, second and third levels of said output signal of said amplifier, for producing said pulse signals and allowing said constant current circuit to produce said charging and discharging currents alternately in synchronized relationship with said pulse signals.

2. A control apparatus according to claim 1 further comprising a comparator, connected to compare the level of said output signal of said amplifier with a reference level having a predetermined level between said second and third levels, for producing an output signal having one constant level corresponding to said first and third levels and the other constant level corresponding to said second level, and wherein said pulse generator is connected to be responsive to said output signal of said comparator for determining the duty ratio of said pulse signals in response to said one and the other constant levels.

3. A control apparatus according to claim 1, wherein said amplifier includes:
    a first input transistor connected to be responsive to said voltage developed across said resistor;
    a second input transistor connected differentially with said first input transistor to be responsive to a reference voltage;
    an output transistor connected to produce said output signal of said amplifier in response to the difference of said two voltages; and
    a feedback resistor connected to change said reference voltage in response to the operating condition of said output transistor.

4. In a direction indicating system in which either one of two lamp groups, each thereof having at least front, rear and side directional lamps connected in parallel with each other, is energized by a battery and flash periodically for indicating a turning direction of a vehicle, at least the said side lamp of each group being different in wattage than the wattage of the respective front and rear lamp, improved control apparatus comprising:

current detecting means for developing a voltage thereacross corresponding to an electric current flowing from said battery to a said lamp group;

first comparison means for comparing said voltage with a first reference voltage, said comparing means producing first and second output voltages when said voltage is above and below said first reference voltage, respectively;

current source means for producing constant charging and discharging currents;

a capacitor connected to be charged and discharged alternately by said constant charging and discharging currents, respectively, for producing a triangular voltage;

second comparison means for comparing said triangular voltage with a second reference voltage, said second comparison means producing a pulse voltage which determines a repetition frequency of the alternate charging and discharging of said capacitor;

reference modulation means for modulating said second reference voltage of said second comparison means in response to said first and second output voltages of said first comparison means so that the repetition frequency of said pulse voltage is changed; and switching means for energizing a said lamp group periodically at the instant repetition frequency of said pulse voltage of said second comparison means.

* * * * *